(12) United States Patent
Takahashi et al.

(10) Patent No.: US 6,483,983 B1
(45) Date of Patent: Nov. 19, 2002

(54) INFORMATION REPRODUCING METHOD, INFORMATION REPRODUCING APPARATUS AND INFORMATION RECORDING/REPRODUCING APPARATUS

(75) Inventors: Yuzuru Takahashi, Kitaibaraki (JP); Tamotsu Ito, Ayase (JP)

(73) Assignees: Hitachi, Ltd., Tokyo (JP); Hitachi ULSI Systems Co., Ltd., Tokyo (JP)

( * ) Notice: Subject to any disclaimer, the term of this patent is extended or adjusted under 35 U.S.C. 154(b) by 0 days.

(21) Appl. No.: 09/225,555

(22) Filed: Jan. 5, 1999

(30) Foreign Application Priority Data

Jan. 7, 1998 (JP) .......................................... 10-001394

(51) Int. Cl.⁷ .............................. H04N 7/00; H04N 5/93; G11B 27/00
(52) U.S. Cl. ............................... 386/46; 386/52; 386/55
(58) Field of Search .............................. 386/46, 52, 55, 386/109, 4, 6, 68, 69, 53, 95, 107, 117, 38, 1; H04N 7/00, 5/93; G11B 27/00

(56) References Cited

U.S. PATENT DOCUMENTS 4,956,725 A * 9/1990 Kozuki et al.
5,126,851 A * 6/1992 Yoshimura et al.

FOREIGN PATENT DOCUMENTS

| JP | 0777965 | 3/1995 |
| JP | A-7-312737 | * 11/1995 |
| JP | A-8-251531 | * 9/1996 |
| KR | 9312195 | 12/1993 |

* cited by examiner

Primary Examiner—Robert Chevalier
(74) Attorney, Agent, or Firm—Antonelli, Terry, Stout & Kraus, LLP (57) ABSTRACT

A novel information reproducing apparatus and information recording/reproducing apparatus capable of searching and selecting information with ease through common manipulations independent of recording media. A recording medium is employed from which start positions of recorded picture programs and start positions of scenes composing each picture program can be read out as data. Symbols corresponding to the picture programs recorded on the recording medium are displayed in an array on a single display screen. A given one of the symbols being displayed is selected, and reduced start pictures of plural scenes, respectively, which compose a picture program affixed with the selected given symbol are displayed in a partitioned array on the single display screen. A desired one of the plural start pictures of reduced size which are being displayed is selected and determined for reproducing the scene corresponding to the determined start picture fully over the single display screen.

19 Claims, 7 Drawing Sheets

INFORMATION REPRODUCING METHOD, INFORMATION REPRODUCING APPARATUS AND INFORMATION RECORDING/REPRODUCING APPARATUS

BACKGROUND OF THE INVENTION

The present invention relates to a method and an apparatus for recording picture information on a recording medium and reproducing the picture information therefrom. More specifically, the present invention is concerned with an information reproducing method, an information reproducing apparatus and an information recording/reproducing apparatus which allow a picture or program of interest to be selected from a select-enabling picture array for reproducing the same under the conditions which can be set selectably.

As the system for reproducing picture information from a recording media such as disks, there may be mentioned in addition to the popular VTR (Video Tape Recorder) systems, a video CD (Compact Disk) system or the like in which an optical disk of 12 cm in diameter is employed as the recording medium. In recent years, there has been developed a DVD (Digital Video Disk) system in which an optical disk of a same diameter as that of the video CD system and having a recording capacity about seven times as large as that of the latter is employed.

In the DVD reproducing apparatus, a so-called head indexing operation can be performed for displaying a picture of interest at the start. To this end, from the identification numbers affixed, respectively, to picture programs recorded on the optical disk (incidentally, the picture program is referred to as the title in the DVD system, and thus the term "title" will also be used in the following description), the identification numbers assigned, respectively, to a plurality of scenes composing each title (incidentally, the scene is referred to as the chapter in the DVD system, and thus the term "chapter" will also be used herein) and the frame identification numbers assigned, respectively, to the frames which constitute basic units of the picture program, the user inputs the title number, the chapter number and the frame number of the picture of interest for determining the reproducing position on the disk, whereon the picture is reproduced from that position. In this conjunction, reference may be made to, for example, JP-A-7-312737.

Further, when a plurality of additional or accompanying information (e.g. a plurality of pictures taken at various or multiple angles, i.e., so-called multi-angle pictures, right- and left-channel sounds, languages such as Japanese and English and the like) are recorded together with the pictures on a same time base, selection of the accompanying information can be determined in dependence on the selection of the condition(s) for reproduction. Heretofore, selection of the condition for the reproduction of the accompanying information has been realized by changing over the pictures on an information-by-information basis and confirming or checking the content of every information. In some applications, the accompanying information such as mentioned above is recorded in precedence on the disk in terms of a menu containing the conditions for reproduction. In this conjunction, reference may be made to, for example, JP-A-8-251531.

The conventional techniques mentioned above have proven effective in some application such as disks for karaoke system (a system allowing a person or persons to sing along to a music video, e.g. one from which the original vocals have been electronically eliminated) or other systems in which manufacturers of disks have assigned the identification numbers meaningfully (e., assigned the identification numbers to pieces of music, respectively, so that correspondences between the identification and the contents implied by the identification numbers can be clearly understood from data materials annexed to the disk). However, when a picture of interest is to be searched without availability of such auxiliary data material, difficulty is encountered in searching the picture of interest by making access to undetermined locations or positions on the disk, giving rise to a problem. Besides, it is impossible to check en bloc a plurality of accompanying information recorded on the same time base, involving thus, a problem that lots of time is taken for selection of the picture of interest. Furthermore, even in the case where the menu of information has previously been recorded on the disks, the method of displaying the information as well as the method of selecting the information may differ in dependence on intentions of the producers of programs. Consequently, the user is forced to take trouble of checking the individual disks concerning the information displaying/selecting method on a disk-by-disk basis.

SUMMARY OF THE INVENTION

In the light of the state of the art described above, it is an object of the present invention to provide novel and improved information reproducing method, information reproducing apparatus and information recording/reproducing apparatus which are capable of searching and selecting information with ease through common manipulation.

The above and other objects of the invention which will become apparent as the description proceeds can be achieved by providing a system which includes a unit or module for displaying symbols corresponding to picture programs (titles) recorded on a recording medium in an array on a single display screen, a unit or module for selecting a given one of the symbols being displayed, a unit or module for displaying reduced-size start pictures of plural scenes composing the picture program affixed with the selected symbol in a partitioned array on the single display screen, a unit or module for selecting a given one of the plural reduced-size start pictures which are being displayed, and a unit or module for reproducing the scene corresponding to the reduced-size start picture selected and determined fully over the single display screen. In that case, such a recording medium is employed from which both address data of the start positions of the recorded picture programs and address data of the start positions of the plural scenes composing each of the picture programs can be read out. Further, the screen display in which a plurality of reduced size pictures are displayed in a partitioned array can serve as a select-enabling picture array for allowing a user to select a picture of his or her interest.

By virtue of the arrangement according to the present invention, all the contents and information of a picture program can be checked en bloc while allowing the picture programs to be changed over speedily from one to another, which in turn means that search, selection and determination of a picture program of interest can be realized through simplified manipulation procedure.

Furthermore, because the display of the symbols of picture programs and the start picture of a scene can be realized through common procedure on the basis of data available from the recording medium independent of intention of manufacturers of the recording media. Thus, such inconveniences can be avoided that the displaying method as well as manipulating procedure vary in dependence on the intentions of producers of programs or in dependence on the recording media or other factors.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

The information reproducing apparatus and the information recording/reproducing apparatus according to the present invention will be described in detail in conjunction with what is presently considered as preferred or typical embodiments thereof by reference to the drawings. In FIGS. 1 to 9, like reference characters designate like or corresponding parts.

Embodiment 1

Now, a first embodiment of the invention which is applied to a reproducing apparatus of a DVD (digital video disk) system will be described.

Figure 1:
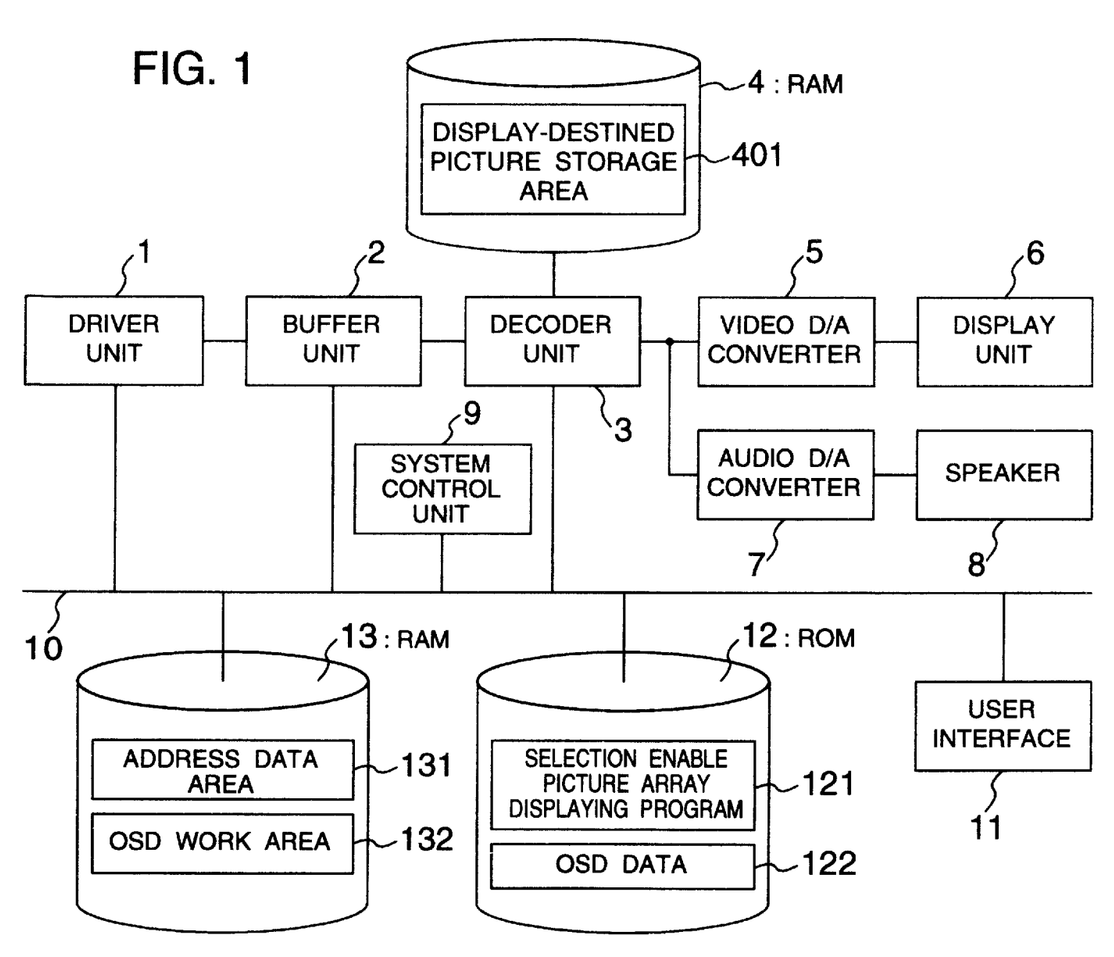
FIG. 1 is a block diagram showing schematically a configuration of an information reproducing apparatus of a DVD system according to a first embodiment of the present invention.

In FIG. 1, reference numeral 1 denotes a driver unit for reproducing information signals from locations on a disk which corresponds to designated addresses, numeral 2 denotes a buffer unit for storing temporarily the information signal outputted from the driver unit 1, numeral 3 denotes a decoder unit for decoding the information signal supplied from the buffer unit 2 on picture and sound bases, respectively, numeral 4 denotes a random access memory (hereinafter referred to as the RAM) for storing or holding data during the operation of the decoder unit 3, numeral 5 denotes a video digital-to-analogue converter (hereinafter referred to as the video D/A converter) for converting a digital video signal outputted from the decoder unit 3 into an analogue signal, numeral 6 denotes a display unit for displaying the analogue picture signal outputted from the video D/A converter 5 on a display screen, numeral 7 denotes an audio digital-to-analogue converter (hereinafter referred to as the audio D/A converter) for converting a digital sound signal outputted from the decoder unit 3 into an analogue sound signal and numeral 8 denotes a speaker for reproducing the analogue sound signal outputted from the audio D/A converter 7.

Further, in FIG. 1, reference numeral 9 denotes a system control unit which is in charge of controlling operations of the driver unit 1, the buffer unit 2 and the decoder unit 3, respectively, numeral 11 denotes a user interface for generating control signals in response to commands inputted by the user, which signals are supplied to the system control unit 9, numeral 12 denotes a read-only memory (hereinafter referred to as the ROM) for storing previously a processing program indicating operating procedure of the system control unit 9 and relevant data, and numeral 13 denotes a random access memory (hereinafter referred to as the RAM) for storing or holding data during operation of the system control unit 9. The driver unit 1, the buffer unit 2, the decoder unit 3, the system control unit 9, the user interface 11, the ROM 12 and the RAM 13 are interconnected by a bus line 10.

At this juncture, it should be mentioned that the decoder unit 3 is imparted with a function for diminishing or reducing the size of picture for display upon decoding of the picture signal.

Further, according to the teachings of the present invention, there are stored in the ROM 12 a selection enable picture array displaying program 121 and data of picture to be displayed in superposition on a picture to be reproduced (hereinafter referred to as the OSD (On Screen Display) picture), i.e., OSD data 122 in addition to an ordinary control processing program and control data for the system control unit 9. Further, the RAM 13 is provided with an address data area 131 for storing address data indicating a reproduction start position of a title of a picture (or picture program) recorded on the disk and address data for storing address data indicating reproduction start positions of chapters, and an OSD work area 132 for storing OSD data converted to bit map data for display on the screen. On the other hand, the RAM 4 is provided with a display-destined picture storage area 401 for accommodating the data for selection enable picture array, which data can be derived by synthesizing the OSD bit map data and the picture data.

The user interface 11 is comprised of a remote control unit through which the user can input his or her commands and an infrared-ray transmission line for transmitting control signals generated by the remote control unit to the reproducing apparatus. An exemplary disposition or array of input buttons in the remote control unit is illustrated in FIG. 2.

Figure 2:
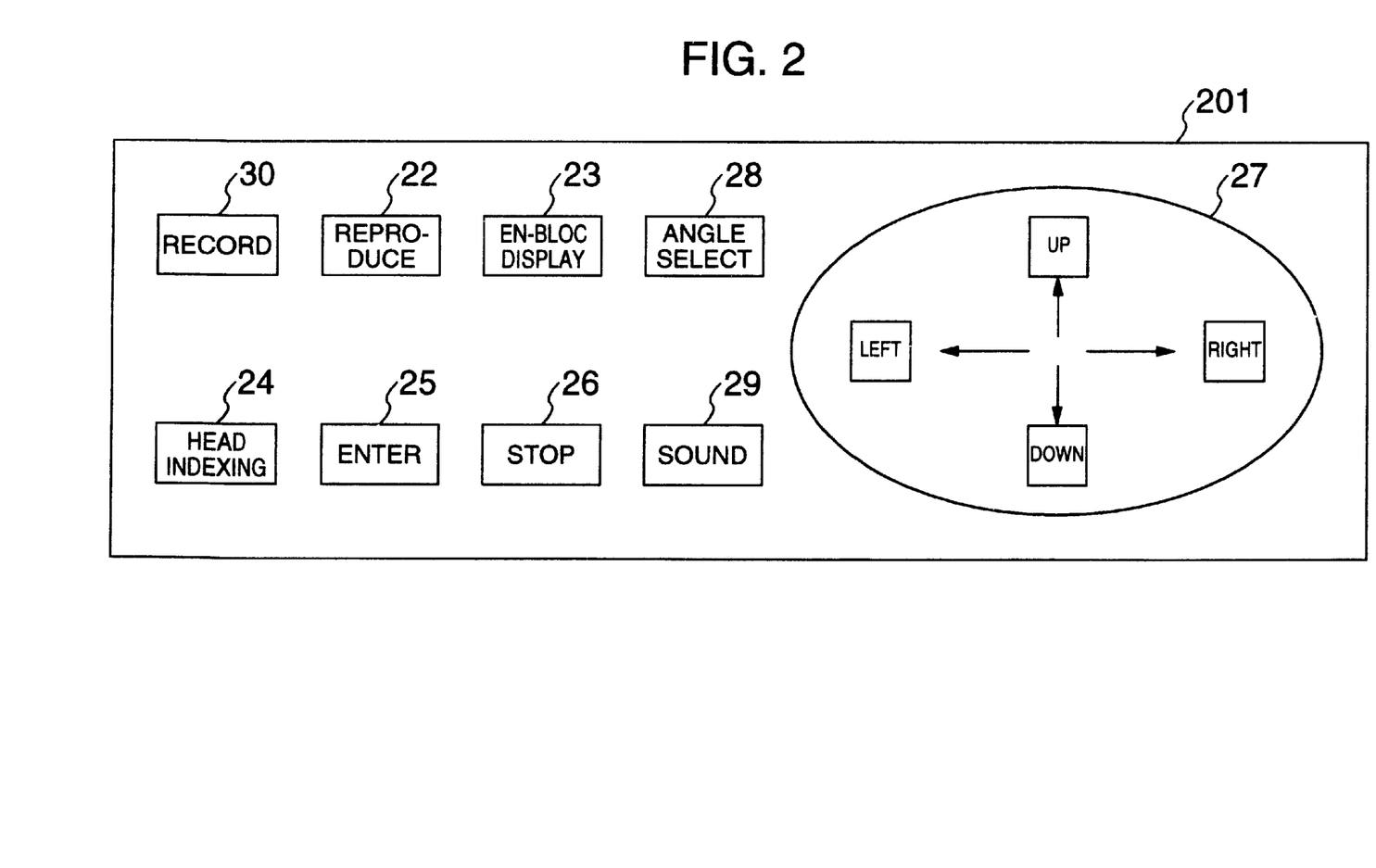
FIG. 2 is a view for illustrating disposition of manipulation buttons in a remote control unit which can be employed not only in the reproducing apparatus according to the first embodiment of the invention but also in other embodiments.

Referring to FIG. 2, the input buttons provided in the remote control unit 201 include a reproducing button 22 for commanding reproduction of data from the disk, an en-bloc display button 23 which is used when a picture of interest is to be selected, an enter button 25 for deciding a picture of interest from those displayed on the screen (selection enable picture array) in response to manipulation of the en-bloc display button 23, a stop button 26 for stopping reproduction of picture, an angle select button 28 manipulated for selecting one of multi-angle pictures, a sound button 29 manipulated for selectively determining of sound reproducing condition and a cursor button array 27 manipulated for selecting a picture or a symbol displayed on the screen in response to manipulation of any one of the en-bloc display button 23, the angle select button 28 or the sound button 29. The control signal representing the command inputted by the user is generated when the user pushes the relevant button. Parenthetically, there are further provided in association with the cursor button array 27 the buttons for moving upward or downward or to the left or the right a cursor on the screen in accordance with arrows for thereby designating a target to be selected. Further, provided additionally are a head indexing button 24 for allowing the user to input an address of a picture of interest, which address is previously known to the user, for reproducing the picture of interest, and a recording button 30 for starting the recording.

Figure 3:
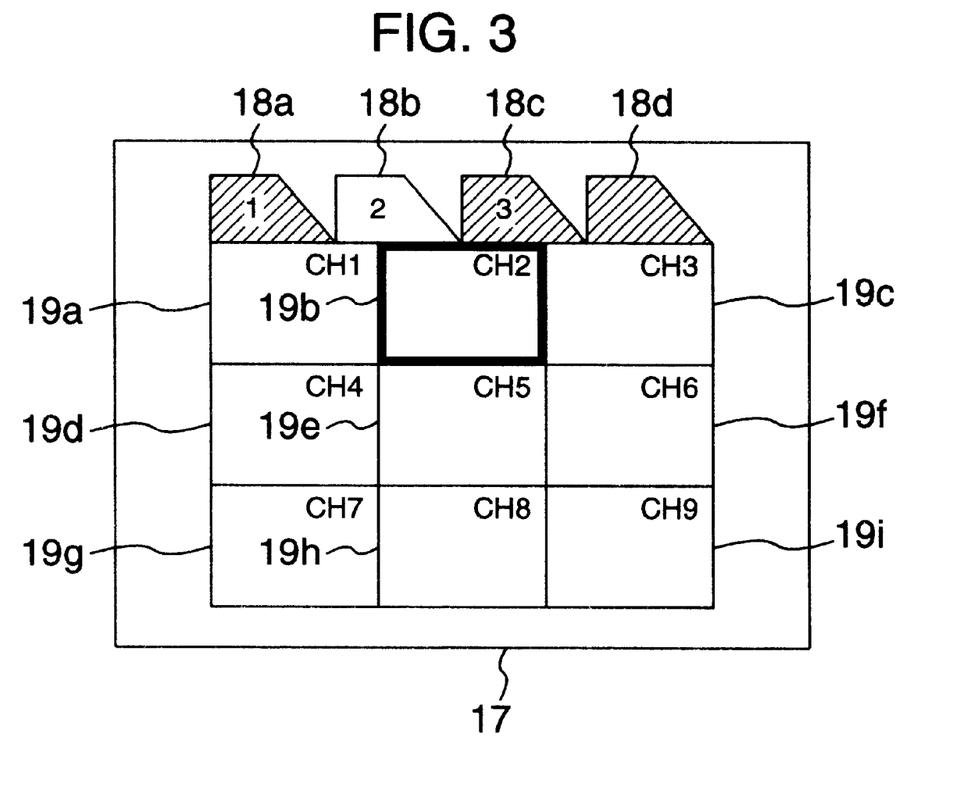
FIG. 3 is a view showing, by way of an example, a selection enable picture array displayed for allowing user to select a picture of interest in the reproducing apparatus according to the first embodiment of the invention.

FIG. 3 shows an example of the selection enable picture array which can be generated by activating the selection enable picture array displaying program 121 (see FIG. 1) according to the present invention. Symbols representing titles contained on a disk are displayed, respectively, in terms of identification numbers within frames (hereinafter referred to as the tags) 18 displayed in a top row on the selection enable display 17, wherein start pictures 19 of individual chapters belonging to the selected title are disposed in an array, each being diminished or reduced in size. Hereinafter, the picture which is reduced or diminished in size will be referred to as the reduced picture. In the case of the example illustrated in FIG. 3, it is assumed that the number of the titles is three and that a second title (title "2") is being selected, which is indicated by increased luminance of the associated tag 18b. Thus, reduced pictures 19a to 19i of nine chapters belonging to the second title are displayed, respectively, wherein the second reduced picture 19b is being selected. The total number of the tags which can be displayed is four. However, on the assumption that the number of the titles is three, no entry exists within the fourth tag 18d. At this juncture, it should be mentioned that the tags 18 and the numerals displayed within the tags, the chapter identification numbers (e.g. CH1 . . . , CH9) affixed to the reduced pictures 19a to 19i, respectively, and border lines delimiting the reduced pictures, exclusive of the contents of the reduced pictures themselves, constitute the OSD picture mentioned hereinbefore.

Figure 4:
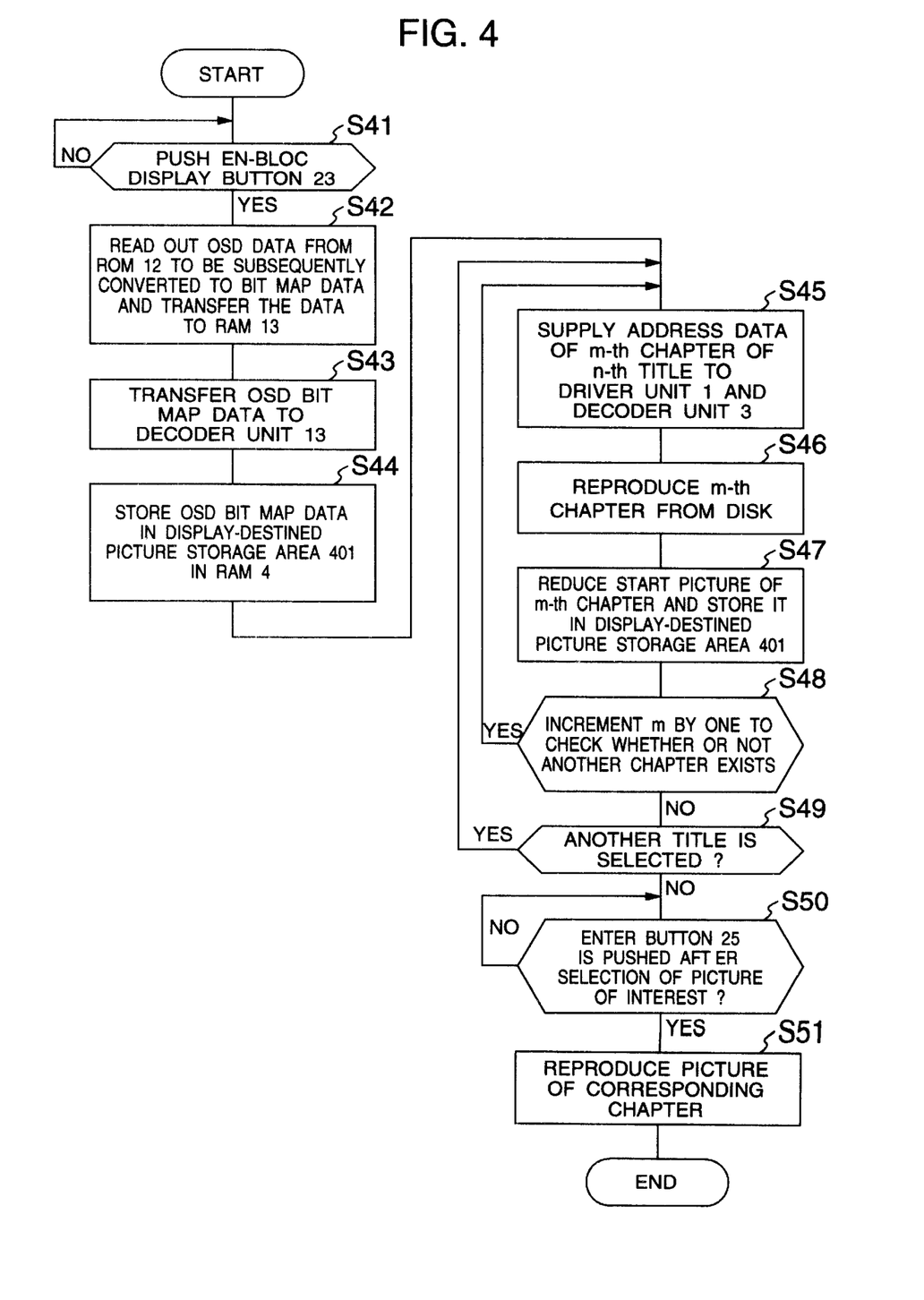
FIG. 4 is a flow chart for illustrating processings executed by a selection enable picture array displaying program according to the first embodiment of the invention.

Next, processings executed by the system control unit 9 in accordance with the selection enable picture array displaying program 121 according to the instant embodiment of the invention will be described by reference to a flow chart shown in FIG. 4. Execution of the processing now under consideration is started after the address data indicating the reproduction start positions of all the titles and all the chapters of the pictures recorded on a digital video disk have been stored in the address data area 131 of the RAM 13. The storage of such address data is commonly performed in the conventional disk reproducing apparatuses. In the case of the information reproducing apparatus according to the instant embodiment of the invention, the storage of the address data is performed immediately upon manipulation of the reproducing button 22 provided in the remote control unit 201 after the disk has been loaded in succession to the power-on of the reproducing apparatus. The address data can be obtained straightforwardly from the buffer unit 2 without the aid of the decoder unit 3 (see FIG. 1).

In the following description, the identification number of the title contained in the disk will be represented by n while representing by m the identification number of the chapter belonging to the title.

When user pushes the en-bloc display button 23 of the remote control unit 201 (step S41), OSD picture data corresponding to the number of tags to be displayed simultaneously on the screen (four in the case of the example illustrated in FIG. 4) are extracted from the OSD data 122 stored in the ROM 12 to be subsequently converted to the bit map data for the display on the screen, whereon the bit map data resulting from the conversion are transferred to the OSD work area 132 of the RAM 13 (step S42). The OSD picture data stored are then sent to the decoder unit 3 (step S43). The decoder unit 3 places the received data in the display-destined picture storage area 401 of the RAM 4 (step S44). At this time point, the decoder unit 3 is informed of the number of titles recorded on the disk and prescribed values of the luminance level of the reduced pictures to be reproduced in the selection enable picture array. When the luminance level as increased has attained the prescribed value after the start of the reproduction, the reduced pictures each of one frame are adopted as the chapter start pictures, respectively, in the selection enable picture array. Further, the decoder unit 3 enters the numerals indicative of the title identification numbers sequentially in the tags on the basis of the number of the titles as informed, whereon the resulting data are stored in the display-destined picture storage area 401. Parenthetically, adoption of the numerals as the symbols indicating the title identification numbers is only by way of example. It goes without saying that other symbols or simplified names may be adopted to this end, as occasion requires.

Subsequently, the address data of the first chapter (m=1) of the first title (n=1) is read out from the address data area 131 to be sent to the driver unit 1 and the decoder unit 3 (step S45). In response, the driver unit 1 starts reproduction of the information, starting from the reproduction start position of the disk which corresponds to the address data (step S46). The decoder unit 3 reduces the picture represented by the reproduced signal to thereby store or place the corresponding reduced screen picture data in the display-destined picture storage area 401. In that case, the reduced screen picture data is stored at the predetermined position in the display-destined picture storage area 401 so that the reduced screen picture can be placed at a position (19a in FIG. 3) which corresponds to the chapter identification number (m=1) in the selection enable picture array. Additionally, the decoder unit 3 places in the display-destined picture storage area 401 the data for increasing the luminance of the tag corresponding to the title "1".

Thereafter, the reduced screen picture of the succeeding chapter (m=2) is disposed at the position for the relevant chapter identification number (reduced picture 19b in FIG. 3) with the data for the reduced screen picture of that chapter being placed in the display-destined picture storage area 401 through the similar processing procedure. In this manner, the reduced pictures of the individual chapters are placed at the respective relevant positions. Thus, the selection enable picture array for the first title has been completed in the display-destined picture storage area 401 (step S47).

Next, it is assumed that the user selects the tag having the numeral "n" entered, i.e., the n-th title, by manipulating the cursor button array 27 (step S48). Then, the reduced screen pictures representative of the individual chapters belonging to the n-th title are disposed at respective positions, whereupon the processing step S45 to the processing step S47 are executed, whereby the selection enable picture array for the selected title has been completed.

When the user selects a reduced screen picture by manipulating the cursor button array 27 (step S49), the border line delimiting the reduced screen as selected is displayed thick, indicating clearly the selection of that picture.

It should be recalled that FIG. 3 shows the selection enable picture array in the case where the title number "2" and the chapter number "2" have been selected (i.e., where n=2 and m=2). In case the picture which the user is to enjoy is the picture of this chapter (m=2), then he or she can push the enter button 25 disposed on the remote control unit 201. At that time point, a selecting manipulation clear command is sent to the decoder unit 3 with the address data for that chapter being supplied to the driver unit 1 (step S50).

Upon reception of the selecting manipulation clear command, the decoder unit 3 erases the OSD picture data and invalidates the picture diminishing operation. On the other hand, the driver unit 1 reproduces the information of the corresponding chapter. Thus, the picture of that chapter is displayed fully over the whole display screen (step S51), whereupon the processing procedure under discussion comes to an end.

In the foregoing description of the reproducing apparatus according to the instant embodiment of the invention, it has been assumed that the start pictures of the individual chapters, respectively, are displayed. It should however be appreciated that the start picture and a plurality of succeeding pictures of each chapter may be displayed in a reduced size instead of displaying only the start picture. In that case, still pictures may be displayed in a sequence or alternatively a moving picture of a predetermined duration may be displayed. The selection enable picture array mentioned just above is very advantageous in that the information about the contents of the individual chapters is made available in the concrete for the user.

Further, in the case of the reproducing apparatus according to the instant embodiment of the invention, the reduced pictures of the individual chapters are displayed at respective fixed positions on the display screen. It should however be understood that when the start picture and a plurality of succeeding pictures are to be displayed all in a reduced or diminished size, the relevant reduced pictures may be displayed sequentially on the display screen by changing the display position from one to another. In this conjunction, it is however noted that when a plurality of still pictures are to be displayed in sequence, the reduced pictures will be displayed in a strobe-like fashion.

In the foregoing description, it has been presumed that what the invention is concerned with is the digital video disk. It should however be appreciated that the present invention is never restricted to the digital video disk but can find application to other types of disks or tape-like recording media substantially to same advantageous effects so long as picture program data have been previously recorded on the media mentioned above.

The selection enable picture array described above can be generated commonly for given recording media on which picture programs data have been recorded. Thus, in the reproducing apparatus according to the present invention, the user can select the picture program to be enjoyed through manipulation of the remote control unit, which manipulation may be essentially same for different recording media.

Further, a plurality of chapters can be viewed en bloc on a title-by-title basis. Besides, selection of the title can be made instantaneously through button manipulation. Thus, the user can easily get information about composition of the picture program recorded on a disk.

It should further be mentioned that the principle underlying the arrangement for displaying a plurality of reduced pictures and selection of a picture through the button manipulation according to the present invention can be applied equally to selection of multi-angle pictures (i.e., pictures of an object taken at a multiplicity of angles), selection of condition for sound reproduction, selection of languages for speech reproduction and so forth. The multi-angle pictures may be included in the chapter(s) when it is desired by the producer of a program. In that case, presence of multi-angle pictures can be notified in the picture screen for the chapters. The address data of the multi-angle pictures are available from the disk.

Figure 5:
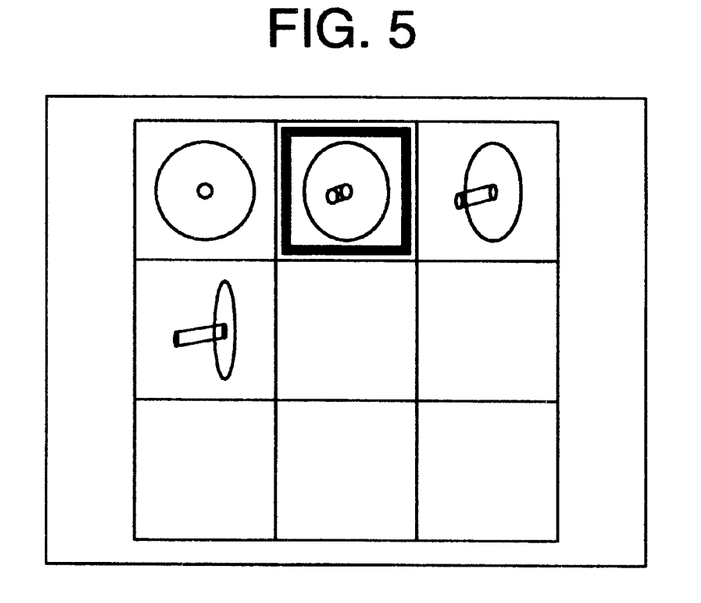
FIG. 5 is a view for illustrating, by way of an example, a selection enable picture array for multi-angle pictures.

More specifically, when user pushes the angle select button 28 of the remote control unit 201 (see FIG. 2) upon recognition of the presence of the multi-angle pictures, the selection enable picture array displaying program 121 changes over the chapters to the display of the multi-angle pictures to execute the processing steps S41 to S51, whereby a plurality of diminished multi-angle pictures are displayed on the display screen en bloc in an array. An illustrative example of such array of picture screens (or selection enable picture array) is illustrated in FIG. 5.

When the user selects an angle picture which he or she desires to watch by manipulating the cursor button key array 27 (such selection is indicated by enclosure of the selected picture by a thick line, as mentioned previously), the selected picture is reproduced fully over the whole display screen upon actuation of the enter button 25.

Similarly, since the data for a variety of reproducing conditions are available upon starting of disk reproduction, a plurality of conditions for the reproduction can be displayed en bloc on the single display screen owing to the arrangement described above. Thus, the user can selectively determine the desired condition for the reproduction without difficulty.

Figure 6:
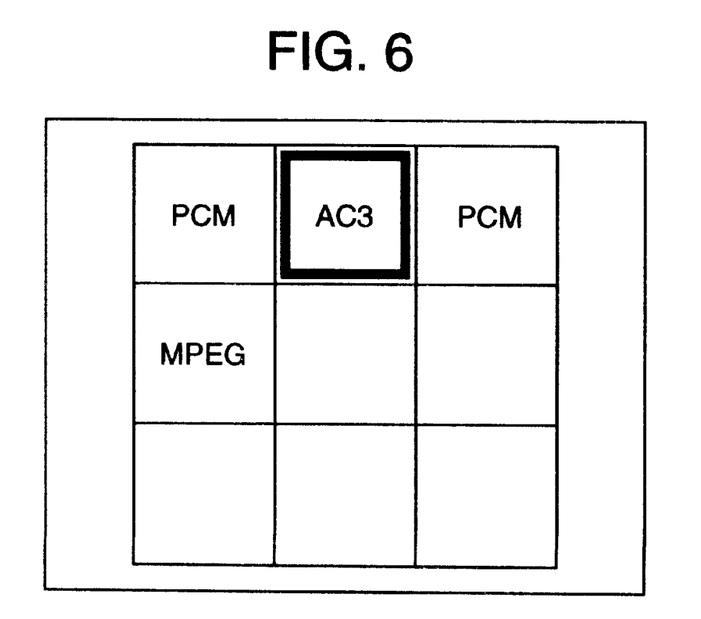
FIG. 6 is a view for illustrating, by way of an example, a selection enable picture or image array for sound information.

FIG. 6 shows an illustrative example of a selection enable picture array in the case where selection of the conditions for the reproduction is selection of sound from various types thereof. As can be seen in the figure, sounds can be discriminatively displayed by the information indicative of the sound systems. Thus, the user can know at a glance what types or species of sound information are recorded on a disk of concern. In the case of the example illustrated in FIG. 6, there are displayed four types of sounds recorded by resorting to linear PCM (Pulse Code Modulation) technique, Dolby-AC3 technique and MPEG (Motion Picture coding Experts Group standards) techniques which are accepted as the international standards concerning the sound recording/reproduction techniques for the digital video disks. As can be seen in the figure, sound recorded by the Dolby-AC3 technique is selected. accordingly, when the enter button 25 is pushed, the Dolby-AC3 sound can be reproduced.

Additionally, according to the teachings of the present invention incarnated in the embodiment described above, it is equally possible to replace the titles mentioned previously by a variety of items representing the conditions for reproduction (e.g. types of sounds, languages, reproduction modes and so forth) by partitioning the display screen into a plurality of reduced picture screens for displaying en bloc the conditions for reproduction on an item-by-item basis.

Embodiment 2

Figure 7:
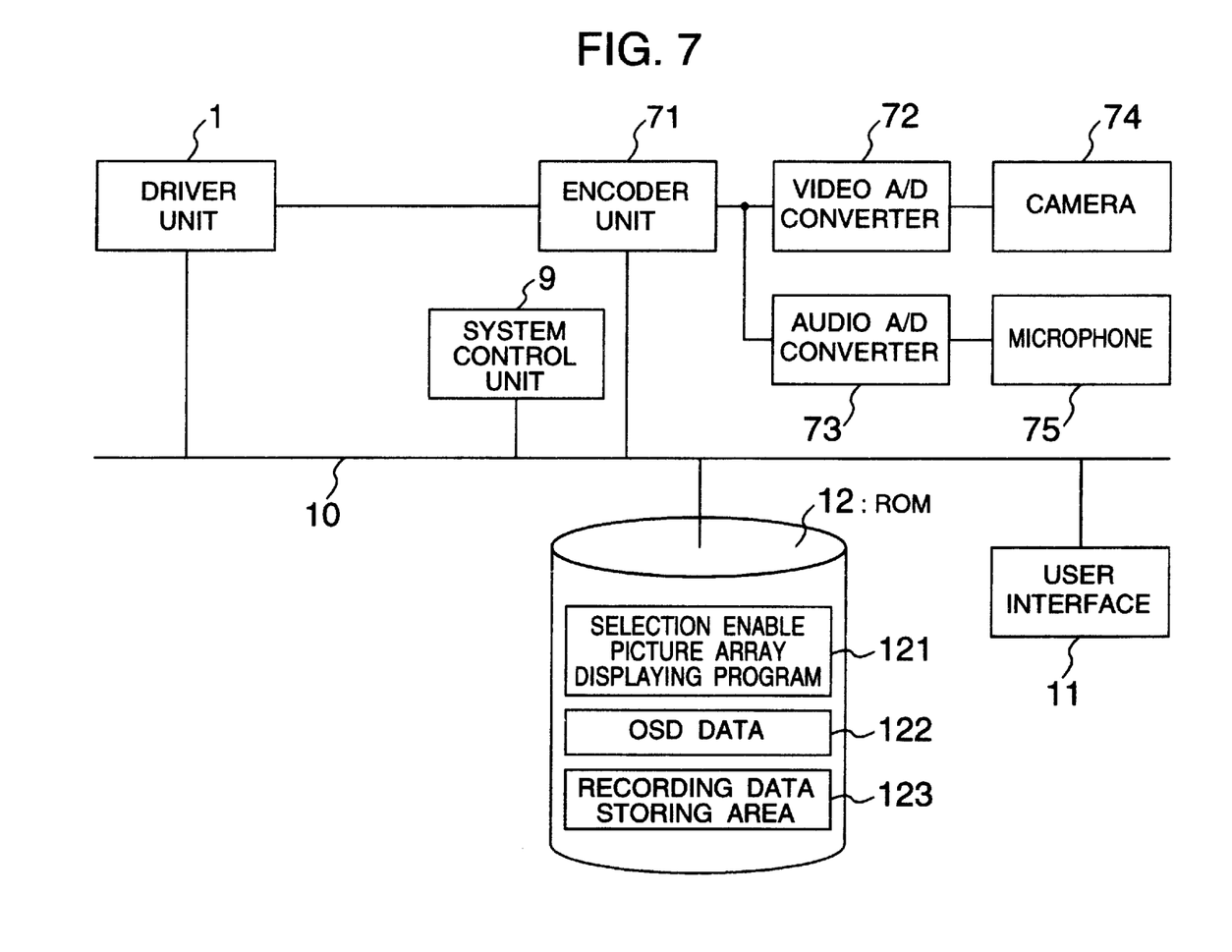
FIG. 7 is a block diagram showing schematically an information recording/reproducing apparatus according to a second embodiment of the present invention.

FIG. 7 shows an information recording/reproducing apparatus according to a second embodiment of the present invention which is comprised of an reproducing apparatus imparted with a function for recording information and in which the selecting operations or manipulations similar to those described in conjunction with the first embodiment can be performed upon reproduction of the information recorded. Incidentally, in FIG. 7, the structure of the reproducing apparatus is omitted from illustration for simplification.

According to the teachings of the invention incarnated in the second embodiment, the selection enable picture array displaying program 121 is added with a processing program for allowing the system control unit 9 to save recording data (i.e., data to be recorded) on a disk. Further, a writable memory (e.g. nonvolatile memory such as EEPROM (electrically erasable and programmable read-only memory), flash memory or the like) is adopted as the ROM 12, wherein a recording data storing area 123 for saving or holding the recording data is provided.

For recording a picture by using a video camera 4, a picture signal outputted from the camera 74 is converted into a digital video signal by means of a video A/D converter 72, while a sound signal picked up through a microphone 75 is converted into a digital sound signal by means of an audio A/D converter 73, whereon both the digital signals are recorded on a disk by the driver unit 1 after having been coded by the encoder 71. The recording operation is started in response to user's manipulation of the recording button 30. The position on the disk from which the recording is to be started is indicated by the address data of the position information read out from the disk. Accordingly, the system control unit 9 stores the address data in the recording data storing area 123.

By the way, in case the picture (picture program) of concern is composed of a title and chapters belonging thereto, the address data of the start position of the title is stored as well.

The contents of the data stored in the recording data storing area 123 are substantially same as the contents of the address data area 131 made available upon starting of the reproduction. More specifically, for the reproduction, the data stored in the recording data storing area 123 are used to execute the processing steps S41 to S51, whereby the picture or program of interest can be selected.

Parenthetically, the data stored in the recording data storing area 123 can be recorded en bloc on the disk in a free space area thereof. Even in the case where the disk is to be reproduced by other type information recording/reproducing apparatus or information reproducing apparatus, it is equally possible to generate a selection enable picture array similar to the one described hereinbefore by virtue of the selection enable picture array displaying program 121 modified so as to capable of reading out the recorded data from the disk.

As typical employments of the system including a combination of the information recording/reproducing apparatus and a video camera, there may be mentioned, by way of example, recordings of various events such wedding ceremony, travel, sport festival, etc.. In this conjunction, a series of scenes of which recording is started by pushing the recording button 30 of the remote control unit 201 (see FIG. 2) and stopped by pushing the stop button 26 will be termed "stream". Thus, in general, a single record may be defined as a set of plural meaningfully associated streams.

In this conjunction, the record constituted by a set of plural meaningful associated streams will be referred to as "picture program". In such picture program, items such as event name, date, time, place or the like may be used as an index of the record. Of course, it is left to user's selection which of the items such as mentioned above is to be used as the index. In case the data and the time are selected as the index, the temporal data can be derived from the output of a clock incorporated ordinarily in the information recording/reproducing apparatus and used as the index or symbol indicating or identifying the picture program. On the other hand, in order to make it possible to use the event name, place or the like as the index, character buttons may be provided in the remote control unit 201 so that the user can input the name of the event, place or the like by manipulating the character buttons to thereby generate the appropriate symbol or index indicating or identifying the picture program of concern.

Embodiment 3

According to the teachings of the present invention incarnated in a third embodiment thereof, it is proposed that when a picture program composed of plural streams as mentioned above is reproduced, representative reduced pictures of the plural streams are displayed on a display screen, being partitioned in the form of the selection enable picture array for each picture program, in order to allow the user to select his or her desired representative reduced picture from the selection enable picture array. Then, the stream corresponding to the selected representative reduced picture can be reproduced over the whole display screen, being fully magnified.

For realizing the instant embodiment of the invention, both the encoder 71 shown in FIG. 7 and the decoder unit omitted from illustration in FIG. 7 are each implemented by adopting the concept underlying the image compression coding scheme capable of generating at least I-picture. Furthermore, in the information recording/reproducing apparatus according to the instant embodiment of the invention, the selection enable picture array displaying program 121 shown in FIG. 7 is added with a processing program for allowing the system control unit 9 to execute the processings mentioned below.

In the recording processing, the data of the aforementioned symbol or index inputted by the user on a picture program basis (i.e., for each of the pictures) is stored in the recording data storing area 123 of the ROM 12 (see FIG. 7). At the same time, the address data of the start position of the picture program on the disk is stored as well. In addition, address data of the start positions of the streams on the disk are also stored in the recording data storing area 123. The address data mentioned above can be derived from the disk when the recording button 30 is pushed upon recording of the stream.

The processings for the reproduction includes processing for displaying an OSD picture or selection enable picture array in response to manipulation of the en-bloc display button 23, processing for displaying within the tags of the selection enable picture array the symbol(s) or index(es) identifying the picture program(s) stored in the recording data storing area 123, processing for reproducing sequentially the streams of the picture program on the basis of the symbol data and the address data of the picture program and the address data of the streams on a program-by-program basis, processing for selecting a first I-picture of the stream as the representative reduced picture displayed in the selection enable picture array, and processing for starting reproduction of the succeeding stream immediately after the display of the I-picture.

According to the image compression coding techniques such as MPEG1, MPEG2, etc. postulated as the international standards, a picture is composed of three kinds of field pictures, i.e., I-picture, P-picture and B-picture. Of these field pictures, the I-picture undergoes the compression coding within itself and thus can be handled as an independent still picture. Incidentally, the I-picture can be derived from the output of the decoder unit 3.

Figure 8:
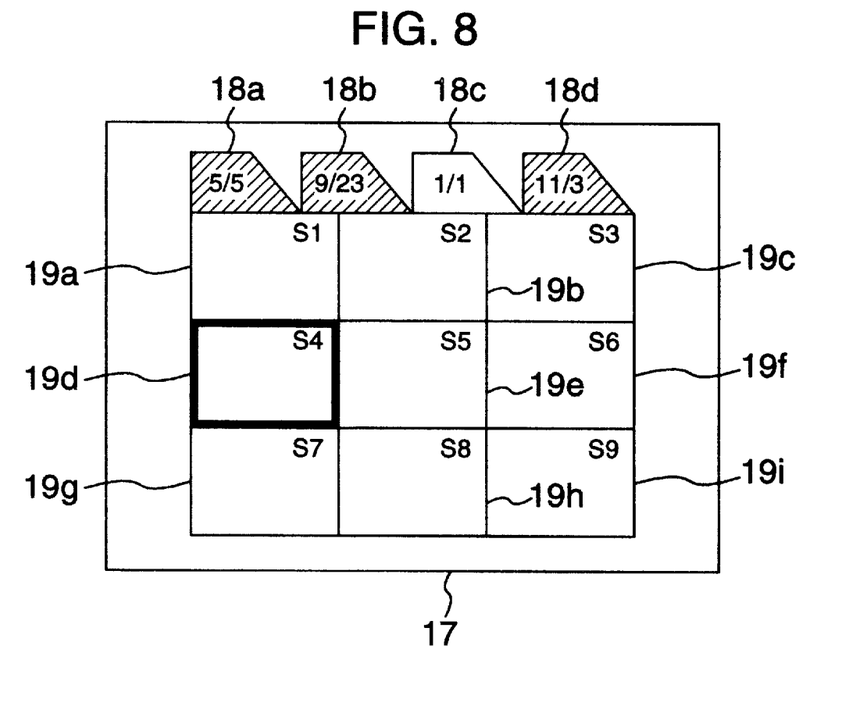
FIG. 8 is a view showing, by way of an example, a selection enable picture array displayed for allowing user to select a picture of interest in an information recording/reproducing apparatus according to a third embodiment of the present invention.

FIG. 8 shows an example of the selection enable picture array generated by the information recording/reproducing apparatus according to the third embodiment of the present invention. As can be seen in the figure, the date information is entered in each of the tags, wherein first I-pictures of plural streams constituting a picture program dated January 1 are displayed as the representative pictures on a reduced scale (step S1 to step S9) and wherein a fourth representative reduced picture S4 is being selected. Upon pushing of the enter button 25 for selecting the stream of interest, the stream selected is reproduced fully over the whole display screen from the beginning.

Incidentally, the various data stored in the recording data storing area 123 can be recorded in a free space area of a disk. Even in the case where the disk is reproduced by other type of the information reproducing apparatus or information recording/reproducing apparatus, it is possible to generate a selection enable picture array substantially same as those described above by providing the selection enable picture array displaying program 121 which is so modified as to be capable of deriving the various relevant data from the disk.

It should further be mentioned that the individual buttons of the remote control unit 201 may be provided at a lateral and/or rear side surface of the video camera in order to facilitate manipulation of the camera.

Embodiment 4

A fourth embodiment of the present invention is directed to the information recording/reproducing apparatus which is so designed that a reduced picture selected by the user is employed as the representative reduced picture of a stream of a picture program instead of the I-picture used in the information recording/reproducing apparatus according to the third embodiment of the invention described above. In the state in which a plurality of streams constituting a picture program have been recorded on a disk, the enter button 25 of the remote control unit 201 may be pushed upon appearance of a picture which is to be selected as the representative reduced picture in the course of reproduction of the stream. By the way, the time period intervening between the start of reproduction of the stream and the push of the enter button 25 can be measured by a timer which is ordinarily incorporated in the information recording/reproducing apparatus. This time period can be used as the data for deriving the representative reduced picture.

The selection enable picture array displaying program 121 according to the instant embodiment of the invention is so modified as to enable the system control unit 9 to execute undermentioned processings in addition to the execution of the processing program according to the third embodiment of the invention described previously.

In the recording operation, the aforementioned temporal (date/time) data of the picture to be used as the representative reduced pictures is stored in the recording data storing area 123 or in a predetermined free space area of the disk. Upon reproduction, the representative reduced pictures are displayed on the screen, being partitioned in an array on the basis of the data stored in the recording data storing area 123 or the free space area.

By the way, the representative reduced pictures are not limited to those selected by the user. The I-picture may alternatively be selected as the representative reduced picture in dependence on the stream. Selection of either the picture selected by the user or the I-picture can be determined in accordance with the command inputted by the user. By contrast, when user's selection is adopted for determining all the representative reduced pictures, even a system which is incapable of generating the I-picture can be adopted as the compression coding system.

Embodiment 5

A fifth embodiment of the invention is directed to an information recording/reproducing apparatus in which the representative reduced picture of a stream is a still picture or a character image created separately by the user on a stream-by-stream basis and recorded on a disk.

The still picture can be generated by a using video camera set to the still picture mode or by a camera dedicated only for taking the still pictures (e.g. electronic still camera), a scanner or the like, whereas the character image can be generated by inputting relevant data by means of a keyboard.

According to the teachings of the invention incarnated in the instant embodiment, an area of a size capable of accommodating the still picture or character image data is provided in the recording data storing area 123 or in the free space area of the disk. Further, there is provided a table containing information concerning correspondences between the streams and the still pictures or the character images, respectively.

The selection enable picture array displaying program 121 employed in the information recording/reproducing apparatus according to the instant embodiment of the invention corresponds to the processing program adopted in the information recording/reproducing apparatus according to the third embodiment except that the former is so modified as to allow the system control unit 9 to execute the processing described below.

After recording of a picture program including a plurality of streams, the still pictures or the character images for the streams of interest are created and stored in the aforementioned free space area on the disk. In that case, the free space area mentioned above is set to a data waiting state for recording the data or information in the above-mentioned table. Subsequently, data reproduction from the disk is performed through the procedure described hereinbefore in conjuction with the second embodiment of the invention, to thereby display a selection enable picture array for the picture program of concern, whereon a reduced picture of the stream of interest is selected and the enter button 25 is pushed. In this conjuction, it should be noted that when the enter button 25 is pushed in the data waiting state, reproduction of the stream is not carried out but the address data of the start position of the stream for which the reduced picture has been selected is furnished to the standby area. The address data is recorded in the aforementioned table as the data which relates the stored still picture or character image and the corresponding stream to each other, whereupon the data waiting state (standby state) is cleared.

In this manner, relations between the still pictures or the character images and the corresponding streams are established on a stream-by-stream basis, to thereby complete the table.

Upon reproduction, the address data of the streams are made available. Accordingly, by referencing the table mentioned above, the relevant still pictures or character images of concern are extracted on the basis of the address data to be displayed in the selection enable picture array as the representative reduced pictures.

Parenthetically, in the information recording/reproducing apparatus according to instant embodiment of the invention, the system which is incapable of generating the I-picture can be adopted as the compression coding system, needless to say.

Embodiment 6

A sixth embodiment of the present invention is directed to an information recording/reproducing apparatus in which a plurality of streams are combined together to a set and one representative reduced picture is generated from the stream set. More specifically, a picture subprogram is constituted by a set of plural streams combined together, while one picture program is constituted by a plurality of picture subprograms. In other words, there is realized a multi-layer structure comprised of the streams, the picture subprograms and the picture program.

According to the teachings of the invention incarnated in the instant embodiment, every time the picture subprogram is generated, processing for affixing a symbol to the picture subprogram is executed. The user can select one representative reduced picture by reproducing the streams constituting the picture subprogram.

The selection enable picture array displaying program 121 according to the instant embodiment of the invention is so modified as to enable the system control unit 9 to execute undermentioned processings in addition to the execution of the processing program according to the third embodiment of the invention described previously.

Reproduction from a disk is performed through similar procedure described hereinbefore in conjunction with the second embodiment to display a selection enable picture array for a picture program of interest. Subsequently, symbols are determined for the picture subprograms to be produced subsequently. The symbol may be selected by the user from ID number, date/time, name of event or place, etc., to be subsequently inputted to the apparatus through button manipulation of the remote control unit, whereby the data of the inputted symbol is generated. Subsequently, the user selects from the selection enable picture array the streams to be contained in a picture subprogram and pushes the enter button 25. After selection and determination of the streams to be included in the picture subprogram, the user then pushes the enter button 25 twice, whereby a command indicating completion of generation of the picture subprogram is inputted.

Until the picture subprogram has been completed, data of the symbol of the picture program and the address data of the start position thereof, data of symbols of the picture subprograms and the start positions of plural streams contained in each of the picture subprograms are stored in the recording data storing area 123 or the free space area on the disk, being mutually related with one another. Subsequently, the plural streams corresponding to the completed picture subprogram are reproduced to allow the user to selectively determine one representative reduced picture of interest. The data of the selected representative reduced picture can be obtained discriminatively in terms of the time lapse from the starting time point of the stream, as in the case of the information recording/reproducing apparatus according to the fourth embodiment of the invention. The temporal data is stored, being associated with the individual data mentioned above.

Figure 9:
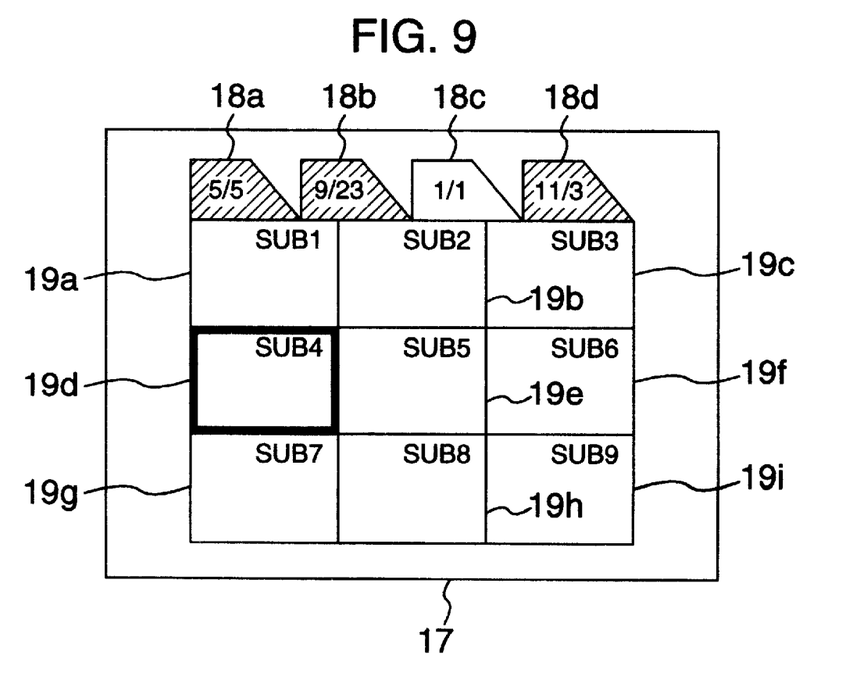
FIG. 9 is a view showing, by way of an example, a selection enable picture array displayed for allowing user to select a picture of interest in an information recording/reproducing apparatus according to a sixth embodiment of the present invention.

By using the relation establishing data stored in this way, it becomes possible to display the selection enable picture array for the picture subprograms. In that case, the selection enable picture array will be similar to the one illustrated in FIG. 8. An exemplary one of such selection enable picture array is illustrated in FIG. 9. Symbol "SUB" on the representative reduced pictures indicates that the associated representative reduced picture is a picture subprogram. The representative reduced picture selectively determined by the user is displayed therein. However, it goes without saying that the symbol to be displayed may be other given symbols affixed to the individual picture subprograms instead of "SUB".

Upon determination of the representative reduced picture desired by the user, a string of streams contained in the determined picture subprogram are reproduced sequentially.

Besides, by making use of the relation establishing data, it is equally possible to display the symbols of the picture subprograms in the tag regions, respectively, while displaying a set of plural streams constituting the picture subprogram in the selection enable picture array on a picture subprogram basis.

The information recording/reproducing apparatus according to the instant embodiment of the invention is very useful in such applications where a picture program is constituted by a large number of streams.

Parenthetically, it goes without saying that the system incapable of generating the I-picture can be dopted as the compression coding scheme.

By contrast, in case the compression coding cheme capable of generating the I-picture is adopted, it is possible to use the first I-picture of the selected stream as the representative reduced picture instead of relying the selection of the representative reduced picture on the user.

Furthermore, the picture screen image itself which displays the representative reduced pictures may be handled as one picture file.

Besides, a representative reduced picture of stream may be disposed internally of the stream or in the vicinity thereof so that the representative reduced picture bears one-to-one correspondence to the stream. Thus, the selection enable picture array can be realized by correcting the representative reduced pictures of the individual streams. In that case, even when an stream or streams are deleted or added, the selection enable picture array can be newly constituted by collecting the representative reduced pictures of the individual streams. Thus, when compared with the case where the selection enable picture array is generated as one picture file, addition and deletion of stream(s) can be realized more easily.

As can be appreciated from the foregoing, according to the teachings of the present invention, the symbols imparted to the picture programs, respectively, and the start reduced pictures of plural scenes contained in the picture program labeled with the symbol selected can be concurrently displayed on a single picture screen. By virtue of this feature, the whole contents recorded on a disk can be rendered visible en bloc, whereby selection and determination of the picture of interest can be realized through simple manipulation. Further, the manipulation is essentially same regardless of the types of the recording media. Thus, trouble involved when the manipulation procedure differs from one to another disk can be avoided.

Many modifications and variations of the present invention are possible in the light of the above techniques. It is therefore to be understood that within the scope of the appended claims, the invention may be practiced otherwise than as specifically described.

What is claimed is:

1. An information reproducing apparatus, wherein a recording medium is employed from which both address data of start positions of recorded picture programs and address data of start positions of plural scenes composing each of said picture programs can be read out, comprising:

means for displaying symbols corresponding to picture programs recorded on said recording medium in an array on a single display screen;

means for selecting a given one of said symbols being displayed;

means for displaying reduced-size start pictures of plural scenes, respectively, which constitute a picture program affixed with said selected given symbol in a partitioned array on said single display screen;

means for selecting a given one of said plural reduced-size start pictures which are being displayed; and means for reproducing the scene corresponding to the reduced-size start picture selected and determined fully over said single display screen.

2. An information reproducing apparatus according to claim 1, wherein said means for displaying the symbols corresponding to the picture programs includes means for generating an array of tags on said single display screen and displaying said symbols within said tags appropriately.

3. An information reproducing apparatus according to claim 1, wherein said recording medium is a medium on which a plurality of pictures taken at multiple angles are additionally recorded as multi-angle pictures and wherein address data of positions which correspond to said multiple angles can be read out from said recording medium, further comprising:

means for displaying a plurality of reduced-size pictures taken at multiple angles, respectively, in a partitioned array on said single display screen;

means for selecting a given one of said plural reduced-size pictures which are being displayed; and means for reproducing the reduced-size picture selected and determined fully over said single display screen.

4. An information reproducing apparatus according to claim 2, wherein said recording medium is a medium on which a plurality of pictures taken at multiple angles are additionally recorded as multi-angle pictures and wherein address data of positions which correspond to said multiple angles can be read out from said recording medium, further comprising:

means for displaying a plurality of reduced-size pictures taken at multiple angles, respectively, in a partitioned array on said single display screen;

means for selecting a given one of said plural reduced-size pictures which are being displayed; and means for reproducing the reduced-size picture selected and determined fully over said single display screen.

5. An information reproducing apparatus according to claim 1, wherein said recording medium is a medium on which plural types of sounds are recorded, being discriminatively identified by sound information and wherein data of each sound information can be read out from said recording medium, further comprising:

means for displaying said sound information in a partitioned array on the single display screen;

means for selecting a given one of said plural sound information being displayed; and means for reproducing the sound corresponding to said sound information selected and determined.

6. An information recording/reproducing apparatus, wherein a recording medium from which address data of positions for recording can be read out is employed for recording a plurality of picture programs each including a plurality of streams each composed of a string of pictures recorded from a time point of starting the recording on said recording medium to a time point of stopping said recording, and wherein the picture is coded by an image compression coding method capable of generating at least I-picture, comprising:

means for storing address data of positions at which said streams are to be recorded and symbols to be affixed to the picture programs at least in either a memory or a free space area of said recording medium;

means for displaying the symbols corresponding, respectively, to the picture programs recorded on said recording medium in an array on a single display screen for reproduction of the picture programs recorded;

means for selecting a given one of the symbols which are being displayed;

means for displaying first I-pictures of plural streams constituting the picture program affixed with said selected symbol as representative reduced-size pictures each of a reduced scale on said single display screen;

means for selecting a given one from said plurality of representative reduced-size pictures which are being displayed; and means for reproducing the stream represented by the representative reduced-size picture selected and determined fully over said display screen.

7. An information recording/reproducing apparatus according to claim 6, wherein said means for displaying the symbols corresponding to the picture programs in an array includes means for generating an array of tags on said display screen and displaying said symbols within said tags appropriately.

8. An information recording/reproducing apparatus, wherein a recording medium from which address data of positions for recording can be read out is employed for recording a plurality of picture programs each including a plurality of streams each composed of a string of pictures recorded from a time point of starting the recording on said recording medium to a time point of stopping said recording, comprising:

means for storing address data of positions at which said streams are to be recorded and symbols to be affixed to the picture programs at least in either a memory or said recording medium;

means for displaying the symbols corresponding, respectively, to the picture programs recorded on said recording medium in an array on a single display screen for reproduction of the picture programs recorded;

means for selecting a given one of the symbols which are being displayed;

means for displaying predetermined pictures, respectively, of plural streams constituting the picture program affixed with said selected symbol as representative reduced-size pictures each of a reduced scale on said single display screen;

means for selecting a given one from said plurality of representative reduced-size pictures which are being displayed; and means for reproducing the stream represented by the representative reduced-size picture selected and determined fully over said display screen.

9. An information recording/reproducing apparatus according to claim 8, wherein said means for displaying the symbols corresponding to the picture programs in an array includes means for generating an array of said tags on said display screen and displaying said symbols within said tags appropriately.

10. An information recording/reproducing apparatus according to claim 8, further comprising:
means for determining a picture contained in the stream and selected by the user as said predetermined picture.

11. An information recording/reproducing apparatus according to claim 9, further comprising:
means for determining a picture contained in the stream and selected by the user as said predetermined picture.

12. An information recording/reproducing apparatus according to claim 8, further comprising:
means for determining as said predetermined picture either a still picture or a character image produced separately by the user.

13. An information recording/reproducing apparatus according to claim 9, further comprising:
means for determining as said predetermined picture either a still picture or a character image produced separately by the user.

14. An information recording/reproducing apparatus according to claim 8, further comprising:
means for determining one picture selected from a plurality of given streams as said predetermined picture.

15. An information recording/reproducing apparatus according to claim 9, further comprising:
means for determining one picture selected from a plurality of given streams as said predetermined picture.

16. An information reproducing method for reproducing information from a recording medium from which both address data of start positions of recorded picture programs and address data of start positions of plural scenes composing each of said picture programs can be read out, said method comprising the steps of:
displaying symbols corresponding to picture programs recorded on said recording medium in an array on a single display screen; and displaying reduced-size start pictures of plural scenes, respectively, which compose a picture program affixed with a given one symbol selected from those displayed, in a partitioned array on said single display screen by using the address data of the start positions of said plural scenes upon selection of said given one symbol.

17. An information reproducing method according to claim 16, wherein when a given one of said reduced-size start pictures of said plural scenes is selectively determined, said given one start picture of relevant scene is reproduced fully over said single display screen.

18. An information reproducing method according to claim 16, wherein pictures succeeding to the start pictures of the plural scenes being displaced each in a reduced size are displayed on said single display screen on a reduced scale.

19. An information reproducing method according to claim 18, wherein when a given one of said reduced-size pictures which succeeds to said reduced-size start pictures is selected and determined, a start picture of the scene to which said determined reduced-size picture belongs is reproduced fully over said single display screen.

* * * * *